United States Patent
Märkle et al.

(10) Patent No.: US 9,925,509 B2
(45) Date of Patent: Mar. 27, 2018

(54) METHOD FOR COMBINATORIAL PARTICLE MANIPULATION FOR PRODUCING HIGH-DENSITY MOLECULE ARRAYS, IN PARTICULAR PEPTIDE ARRAYS, AND MOLECULE ARRAYS THAT CAN BE OBTAINED BY MEANS THEREOF

(71) Applicant: PEPperPRINT GmbH [DE/DE], Heidelberg (DE)

(72) Inventors: Frieder Märkle, Karlsruhe (DE); Alexander Nesterov-Müller, Philippsburg (DE); Frank Breitling, Heidelberg (DE); Felix Löffler, Heidelberg (DE); Sebastian Schillo, Karlsruhe (DE); Valentina Bykovskaya, Karlsruhe (DE); Clemens Von Bojnicic-Kninski, Karlsruhe (DE); Klaus Leibe, Leimen (DE)

(73) Assignee: PEPperPRINTGmbH (DE/DE), Heidelberg (DE)

( * ) Notice: Subject to any disclaimer, the term of this patent is extended or adjusted under 35 U.S.C. 154(b) by 101 days.

(21) Appl. No.: 14/785,136

(22) PCT Filed: Apr. 17, 2014

(86) PCT No.: PCT/EP2014/001046
§ 371 (c)(1),
(2) Date: Oct. 16, 2015

(87) PCT Pub. No.: WO2014/170031
PCT Pub. Date: Oct. 23, 2014

(65) Prior Publication Data
US 2016/0082406 A1   Mar. 24, 2016

(30) Foreign Application Priority Data
Apr. 17, 2013   (WO) ................. PCT/EP2013/001141

(51) Int. Cl.
*B01J 19/00*   (2006.01)
*C40B 50/18*   (2006.01)
*B82Y 30/00*   (2011.01)

(52) U.S. Cl.
CPC .......... *B01J 19/0046* (2013.01); *B82Y 30/00* (2013.01); *C40B 50/18* (2013.01); *B01J 2219/00317* (2013.01); *B01J 2219/00441* (2013.01); *B01J 2219/00466* (2013.01); *B01J 2219/00468* (2013.01); *B01J 2219/00587* (2013.01); *B01J 2219/00596* (2013.01); *B01J 2219/00621* (2013.01); *B01J 2219/00623* (2013.01); *B01J 2219/00626* (2013.01); *B01J 2219/00637* (2013.01); *B01J 2219/00659* (2013.01); *B01J 2219/00675* (2013.01); *B01J 2219/00711* (2013.01); *B01J 2219/00716* (2013.01); *B01J 2219/00725* (2013.01)

(58) Field of Classification Search
None
See application file for complete search history.

(56) References Cited

U.S. PATENT DOCUMENTS

| | | | | |
|---|---|---|---|---|
| 5,143,854 | A * | 9/1992 | Pirrung | G01N 21/6428 435/7.92 |
| 6,083,697 | A * | 7/2000 | Beecher | B01J 19/0046 422/129 |
| 2002/0006672 | A1 * | 1/2002 | Poustka | B01J 19/0046 506/32 |
| 2003/0032204 | A1 * | 2/2003 | Walt | G21K 1/006 436/518 |
| 2010/0143582 | A1 * | 6/2010 | Lieber | B82Y 10/00 427/98.4 |

FOREIGN PATENT DOCUMENTS

| | | |
|---|---|---|
| DE | 10156329 A1 | 2/2003 |
| WO | 02066550 A1 | 8/2002 |

OTHER PUBLICATIONS

Ringeisen, et al., Picoliter-Scale Protein Microarrays by Laser Direct Write; Biotechnol. Prog. 2002, vol. 18, pp. 1126-1129.
Karaiskou, et al., Microfabrication of biomaterials by the sub-ps laser-induced forward transfer process, Applied Surface Science, vol. 208-209, 2003, pp. 245-249.
Serra, et al., Laser direct writing of biomolecule microarrays, Applied Physics A, vol. 79, 2004, pp. 949-952.
Phamduy, et al., Laser direct-write of single microbeads into spatially-ordered patterns, Biofabrication, vol. 4, 2012, pp. 1-12.

* cited by examiner

*Primary Examiner* — Christopher M Gross
(74) *Attorney, Agent, or Firm* — Stinson Leonard Street LLP

(57) ABSTRACT

The present invention relates to a method for combinatorial particle manipulation for producing high-density molecule arrays, and to the high-density molecule arrays obtained therefrom. In particular, the present invention relates to a method for producing high-density molecule arrays, in particular peptide or oligonucleotide arrays, by combinatorial patterning of particles, wherein the patterning is achieved by the selective and direct action of electromagnetic radiation.

Figure 1:
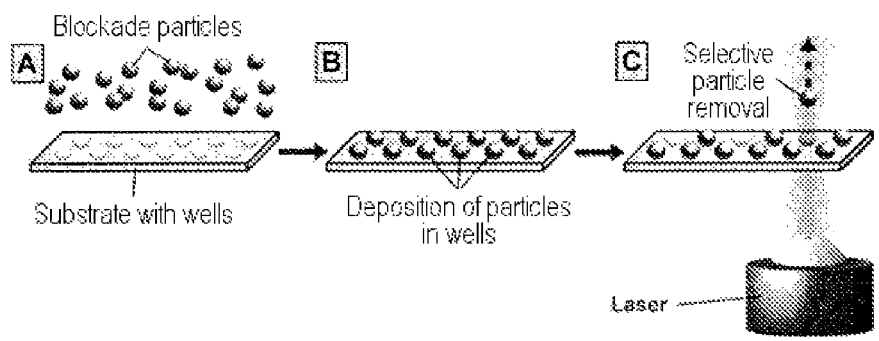

10 Claims, 9 Drawing Sheets a)                              b)

SEQUENCE LISTING

```
<160> NUMBER OF SEQ ID NOS: 2

<210> SEQ ID NO 1
<211> LENGTH: 9
<212> TYPE: PRT
<213> ORGANISM: Artificial Sequence
<220> FEATURE:
<223> OTHER INFORMATION: Synthetic

<400> SEQUENCE: 1

Tyr Pro Tyr Asp Val Pro Asp Tyr Ala
1               5

<210> SEQ ID NO 2
<211> LENGTH: 8
<212> TYPE: PRT
<213> ORGANISM: Artificial Sequence
<220> FEATURE:
<223> OTHER INFORMATION: Synthetic

<400> SEQUENCE: 2

Asp Tyr Lys Asp Asp Asp Asp Lys
1               5
```

METHOD FOR COMBINATORIAL PARTICLE MANIPULATION FOR PRODUCING HIGH-DENSITY MOLECULE ARRAYS, IN PARTICULAR PEPTIDE ARRAYS, AND MOLECULE ARRAYS THAT CAN BE OBTAINED BY MEANS THEREOF

CROSS-REFERENCE TO RELATED APPLICATIONS

This application claims priority to International Publication Number WO 2014/170031, filed on Apr. 17, 2014, which claims priority to International Publication Number WO 2014/169928, filed on Apr. 17, 2013, each of which are hereby incorporated by reference herein in their entireties.

STATEMENT IN SUPPORT FOR FILING A SEQUENCE LISTING

A paper copy of the Sequence Listing and a computer readable form of the Sequence Listing containing the file named "K_4992US_ST25.txt", which is 799 bytes in size (as measured in MICROSOFT WINDOWS® EXPLORER), are provided herein and are herein incorporated by reference. This Sequence Listing consists of SEQ ID NOs:1-2.

The present invention relates to a method for combinatorial particle manipulation for producing high-density molecule arrays, and to the high-density molecule arrays obtained therefrom. In particular, the present invention relates to a method for producing high-density molecule arrays, in particular peptide or oligonucleotide arrays, by combinatorial patterning of particles, wherein the patterning is achieved by the selective and direct action of electromagnetic radiation.

In microarray technology, a large number of different molecules are arranged in a predefined pattern on a substrate surface in immobilized form.

This technology allows analyses and/or chemical reactions to be carried out on a very large number of different substances and is preferably used in biotechnological research and in the pharmaceutical industry for high-throughput screenings.

This is advantageous in particular in the synthesis of larger molecules whose properties and in particular whose interactions with one another are often so complex that they can only be studied experimentally. In combinatorial chemistry, such molecule arrays allow all the products synthesized thereon to be tested in parallel for specific properties. In the case of peptide arrays, these can be antibody interactions, for example. However, there is a lack of methods for producing such molecule arrays in high quality and in the necessary resolution.

The production of in situ peptide arrays was first described in Frank R., Tetrahedron, 48 (1992), 9217-9232, wherein a solid-phase-coupled peptide synthesis (Merrifield synthesis) was used. To that end, the 20 different amino acid derivatives are applied in a solvent to defined spots of an amino-terminated substrate and a large number of peptides are thus built up side by side and layer by layer in a combinatorial synthesis. A disadvantage of this "spot synthesis" is, however, that it has hitherto been possible to synthesize therewith only approximately 25 peptides per $cm^2$. The reason for this is that small liquid droplets are very difficult to meter, so that the required viscous solvents "creep" along the surface, and that these droplets must not evaporate for a relatively long time during the coupling reaction.

In the prior art, various methods for producing peptide arrays have recently been proposed. Existing systems are based on xerography for the combinatorial deposition of particles. The particles used comprise amino acid derivatives. It is thereby possible to produce peptide arrays using a special laser printer for particle-based synthesis, as described in Stadler, V., et al., "Kombinatorische Synthese von Peptidarrays mit einem Laserdrucker", Angewandte Chemie, 2008, 120 (37), 7241-7244 and as also described in EP 1 140 977 B1 or DE 101 56 329 A1, the light pattern of an LED line thereby first produces a charge pattern on a photo roller. Triboelectrically charged particles are deposited on the oppositely charged regions of the photo roller, and a particle pattern forms. This particle pattern is transferred from the photo roller to a substrate. The particles are then fixed to the substrate by heating. However, such a method does not allow the particles to be patterned directly.

Although the above-described laser printers for the particle-based synthesis and production of peptide arrays have already proved successful commercially, only particle patterns having a pitch, that is to say a midpoint-to-midpoint spacing of the spots, of 350 μm can be achieved with such printers. Furthermore, the number of monomers which can be used for a synthesis is limited by the number of printing units in the laser printer. Because the printing units must be precisely aligned with one another, the susceptibility to faults increases with each printing unit. Because the complexity of the printer also increases with each further printing unit, it is very expensive to construct a printer having 20 printing units or more while maintaining the printing accuracy.

Another method is based on the use of a semiconductor chip, as described, for example, in Beyer, M., et al., "Combinatorial synthesis of peptide arrays onto a microchip", Science, 2007, 318 (5858), 1888. This is a special high-voltage CMOS chip, the surface of which is divided into different electrodes. By programming the chip, specific electrodes can be switched on. As a result of the electric fields that are produced, charged particles are selectively deposited on the electrodes which have been switched on. The synthesis of the molecule array can either be carried out directly on the chip surface, or the entire particle pattern on the chip is transferred by means of an electric field to a target substrate, such as, for example, a glass specimen slide, where the synthesis also takes place.

In the case of a high-voltage CMOS chip, the usable area of the chip, as a result of the production process, is very small, 12 mm×12 mm in current models. This means that the number of different molecules is very limited owing to the area that is available.

In the chip-based method, the selective deposition of particles takes place from an aerosol. In order to achieve reproducible results, very high requirements must be made of the aerosol parameters, such as, for example, aerosol density, particle speed and particle charge. However, this can be carried out in practice only with difficulty and leads to problems and delays because a very large number of influencing variables have to be taken into consideration, such as, for example, aerosol passage, flow dynamics, particle size distribution, humidity, etc.

Lithographic methods for producing peptide arrays are also known, which methods are based on photolabile protecting groups which are cleaved by irradiation with light, as described, for example, in Fodor, S. P. A., et al., "Light-Directed, Spatially Addressable Parallel Chemical Synthesis", Science, 1991, 251 (4995), 767-773.

Known lithographic methods have a fundamental disadvantage. For each of the different monomers, the coupling cycle must be carried out separately, that is to say each type of monomer is applied, coupled and excess monomers are washed away, followed by the next type of monomer so that, for example in the case of combinatorial peptide synthesis layer by layer, 20 coupling cycles must be carried out in each case. This leads to quality problems of the resulting molecule libraries, because secondary products or artefacts that are to be expected can form in each coupling cycle. Therefore, lithographic methods have hitherto been used almost exclusively for the synthesis of oligonucleotide arrays because only four different monomers must thereby be coupled to the substrate.

Consequently, in the case of the lithographic techniques for producing peptide arrays, the complex chemistry has meant that the peptide yield has hitherto not been high enough for these techniques to become established.

In addition to the methods mentioned above, the deposition of microparticles in the wells of a patterned substrate has been proposed in Yin, Y., et al., "Template-assisted self-assembly: a practical route to complex aggregates of monodispersed colloids with well-defined sizes, shapes, and structures", Journal of the American Chemical Society, 2001, 123 (36) 8718-8729 and in Kim, Y. H., et al., "Selective assembly of colloidal particles on a nanostructured template coated with polyelectrolyte multilayers", Advanced Materials, 2007, 19 (24) 4426-4430.

Starting therefrom, the object underlying the present invention is to provide a method for producing high-density molecule arrays, in particular peptide arrays, which overcomes the known disadvantages and limitations of the prior art.

The object is achieved by the subject-matter characterized in the claims.

There is provided in particular a method for producing high-density molecule arrays having a pitch of ≤300 μm, wherein the method comprises the following steps:
(i) providing a target substrate having a plurality of discrete spots,
(ii) conditioning selected spots by the selective and direct action of electromagnetic radiation, and
(iii) reacting at least one monomer with reactants present in immobilized form in the selected spots of the target substrate.

According to the present invention, the patterning of the target substrate with different monomers for the combinatorial synthesis is achieved in that particles are influenced directly and thus patterned:
either by fixing particles at defined sites and/or transferring particles to defined sites by means of electromagnetic radiation, or
by removing particles at defined sites by means of electromagnetic radiation in order thus to permit access to those sites.

Both variants of the method according to the invention for combinatorial particle patterning combine the technical advantages of the lithographic and the particle-based patterning methods and at the same avoid the disadvantages thereof, as will be described in detail in the following.

According to the present invention, the expression "molecule array" is understood as meaning a molecule library bound to a substrate, wherein the molecule library includes the totality of many different molecules bound to defined sites of the substrate (so-called spots). This substrate, to which the molecules are bound, is also referred to as the target substrate.

According to the invention, it is possible to produce a high-density molecule array having a pitch of ≤300 μm. This means that the spacing of the individual spots, also called the pitch, in each case measured from the midpoint, is ≤300 μm. According to the present invention, the pitch of the molecule array is preferably ≤200 μm, more preferably ≤150 μm and particularly preferably ≤100 μm.

In the following, the term "array" is understood as meaning both substrates in which different molecules are arranged substantially in only two dimensions and porous substrates or substrates having a patterned surface, in which the different molecules are present in an additional third dimension.

Furthermore, the expression "discrete spot" is understood as meaning a region of a (target) substrate which is spatially separate from adjacent spots. According to the present invention, the spots can be separate from the adjacent spots both as a result of a geometric shaping and as a result of different surface properties. For example, the spots can be separated from one another in the form of thin partition walls or by means of web structures, or they can be present in the form of wells. In addition, it is possible that the spots are present in the form of discrete regions, for example as a result of different wetting properties of the surface of the substrate.

According to a first preferred embodiment of the present invention, the patterning of the target substrate with different monomers for the combinatorial synthesis is achieved by fixing particles at defined sites and/or transferring particles to defined sites by means of electromagnetic radiation.

In particular, this embodiment of the present invention comprises the above-defined steps of (i) providing a target substrate having a plurality of discrete spots, (ii) conditioning selected spots by the selective and direct action of electromagnetic radiation, and reacting at least one monomer with reactants that are present in immobilized form in the selected spots of the target substrate, wherein there is provided at least one starting substrate having a material layer in the form of a particle layer or film layer in which the at least one monomer is present, and wherein step (ii) of conditioning selected spots comprises the selective transfer of material from the starting substrate to the target substrate and the site-specific fixing of that material to the target substrate, wherein the transfer and/or fixing takes place by means of electromagnetic radiation.

In this method, a starting substrate is used which is coated uniformly with a particle layer as the material layer. This particle layer comprises monomers, for example in the form of monomer particles, for the combinatorial synthesis of molecule arrays. According to the invention, the expression "monomer particles" is understood as meaning particles that comprise monomers or other chemical components for the production of molecule arrays. These monomer particles consist substantially of a polymer matrix into which suitable chemical components or monomers for the combinatorial synthesis of molecule arrays, in particular of peptide or oligonucleotide arrays, are embedded. These monomers can be, for example, amino acid derivatives for the synthesis of peptide arrays.

According to the present invention there can be used as the polymer matrix, for example, polymers such as polystyrene-n-butyl acrylate copolymers, styrene-acrylate copolymers, polydimethylacrylamide, polyester and epoxy resins, without being limited thereto.

Furthermore, further substances can be added to the monomer particles, with the limitation that they must not interfere with the combinatorial coupling reaction. For peptide synthesis, such constituents must in particular not contain $NH_2$ or SH groups; for oligonucleotide synthesis, they should additionally not contain OH groups. For example, there can be added to the monomer particles iron complexes for adjusting the electrical charge of the monomer particles, or substances which influence the absorption behavior. This function can be performed by a large number of substances which are chemically inert and at the same time absorb light, such as, for example, graphite nanoparticles, carbon black particles, fullerenes or bromophenol blue.

Alternatively to a starting substrate having a layer of monomer particles, there can be used according to the present invention a starting substrate which is coated with a uniform monomer film which, like the monomer particles, consists of a polymer matrix and in which monomers and optionally further substances such as absorber materials are embedded. If the polymer matrix has sufficient mechanical stability, a self-supporting film or a block of the mentioned materials can also be used.

Accordingly, the expression monomer film is understood as meaning a material layer which comprises monomers or other chemical components for producing molecule arrays.

As already described above, according to the present invention the material layer can be present on the starting substrate in the form of a particle layer or film layer. In this embodiment, the material with the monomers embedded therein is selectively transferred from the starting substrate to the target substrate, where it is fixed site-specifically. According to the present invention, the transfer of the material, that is to say of the monomers embedded in the polymer matrix, is not limited to a particle form. Within the scope of this embodiment, the transfer of the material includes both the transfer of particles and the transfer of the material in liquid or gaseous form.

According to the present invention, the material with the monomers embedded therein is transferred from a correspondingly prepared starting substrate by means of electromagnetic radiation to a target substrate, where it is fixed selectively and site-specifically. According to the invention, this operation is advantageously repeated with different starting substrates but the same target substrate. It is thus possible for different monomers to be fixed combinatorially and site-specifically to a target substrate at freely selectable sites. In a further process step, these monomers enter in parallel into a chemical reaction with functional groups applied to the target substrate. These are in particular $NH_2$ groups for the synthesis of peptide arrays or OH groups for the synthesis of oligonucleotide arrays. The coupling reaction can be started by heating the site-specifically fixed materials or dissolving them by means of a chemical, so that the embedded monomers are mobilized and are able to diffuse to the surface of the substrate, where they react with the functional groups of the reactants immobilized there. This method is particularly advantageous when the diffusion of the mentioned monomers remains limited by the applied materials assuming an oily or wax-like consistency.

The preparation of the starting substrate, that is to say the production of a homogeneous layer of monomer particles or of a monomer film, can take place by various methods. For example, the monomer particles can be deposited on the starting substrate from an aerosol or a suspension. The monomer particles can be lifted or skimmed from the surface of a liquid or applied to the starting substrate by a doctor blade or a roller. If the monomer particles are electrically charged, electric fields can be used for the deposition.

Coating with a homogeneous film on a substrate can be carried out, for example, by means of spin coating, dip coating or the use of a doctor blade or roller. The monomer film can, however, also be produced in a separate process and, for example, adhesively bonded to the starting substrate. In addition, the monomer film can be applied to the starting substrate by a printing process, such as, for example, inkjet printing.

According to the present invention, the material of the starting substrate is not limited and can be selected according to the target molecule. These materials are known to the person skilled in the art and therefore do not have to be described in detail. There may be mentioned as non-limiting examples polymeric, ceramic or metallic materials. For example, substrates of polydimethylsiloxane in particular can advantageously be used. For the target substrate, reference is made to the remarks hereinbelow.

Both the starting substrate and the target substrate can be provided with a patterning, for example with wells on the micrometer scale. This patterning can permit or improve the purposive transfer of material. If the starting substrate has a patterning, it can be expedient not to coat it homogeneously with a coating but to adapt the coating according to the patterning, that is to say, for example, to fill only the wells in the starting substrate with monomer particles. By filling structures on the starting substrate, the material to be transferred can be portioned, down to individual microparticles per well.

By patterning the target substrate, local limitation of the transfer can take place so that, for example, only individual or a specific number of structures on the target substrate are filled or covered with material of the starting substrate during the transfer.

According to a preferred embodiment of the present invention there are used at least one or more intermediate layer(s) which is or are arranged between the starting substrate and the target substrate. The at least one intermediate layer is preferably situated between the starting substrate and the material layer, that is to say the layer of monomer particles or the monomer film.

The at least one intermediate layer is not specifically limited and can consist, for example, of micro- or nanoparticles, a solid film or a liquid. The intermediate layer can have the function of protecting the monomers on the starting substrate or the target substrate and the reactants situated thereon from the actions of the electromagnetic radiation. This is also the case for indirect actions, such as, for example, heat, vapors, gases or plasma, which are generated by the electromagnetic radiation or chemical reactions which are initiated by the electromagnetic radiation. The at least one intermediate layer can further have the function of establishing the adhesion of further intermediate layers or the adhesion of the material layer to the starting substrate, for example in the form of adhesive layers.

According to a further embodiment, the at least one intermediate layer can assist the transfer of material from the starting substrate to the target substrate. If one or more such intermediate layers are used, the monomer particles or the monomer film can be heated indirectly, for example, by heating the intermediate layer(s) which consist or consists, for example, of carbon or a metal.

According to the present invention there can be used metallic or elemental intermediate layers, such as, for example, of titanium, chromium, gold, copper, tungsten, palladium, silver, carbon, oxidic intermediate layers, such as, for example, of $In_2O_3$, $V_2O_5$, $TiO_2$, photopolymers, such as, for example, azides, triazenes or polymers with integrated triazene groups, or other compounds or mixtures, such as, for example, polyimide or polysiloxane. A plurality of intermediate layers of the same or different material can thereby be used in combination in order to enhance or combine the above-mentioned effects.

Various mechanisms are possible for the transfer of material, and these will be described in detail in the following. The materials used, the wavelength and the irradiation direction of the electromagnetic radiation are each suitably chosen. The irradiation direction can in particular be from the starting substrate towards the target substrate or from the target substrate towards the starting substrate.

According to the invention, the transfer and fixing of the material from the starting substrate to the target substrate can take place by contacting the starting substrate with the target substrate and heating the particle or film layer directly or indirectly by the selective and direct action of the electromagnetic radiation, wherein the material layer is situated between the substrates.

A solid starting substrate, coated with a layer of monomer particles or a monomer film, is thereby brought into contact with a solid target substrate so that the coating is situated between the two substrates. Energy is introduced selectively at specific sites by electromagnetic radiation. The matrix material, together with the substances contained therein, is fixed to the target substrate.

By a suitable choice of the irradiation direction, the materials and the wavelength of the electromagnetic radiation, the material layer, in particular in the form of the monomer particles or monomer film, is either heated directly or it is heated indirectly in that one or more intermediate layers as mentioned above (e.g. of carbon or metal) or one or both substrates are heated by the radiation. Indirect heating of the particles or of the film can also be achieved by mixing with an additive, such as, for example, graphite nanoparticles, which serves as an absorber. The fixed material remains on the target substrate after the two substrates have been separated.

The carrier(s) can preferably also be produced from a flexible material in order to ensure better contact. By means of the chemical modification and/or nano- and/or micro-patterning of the substrate surfaces, adhesion of the heated particles or of the material of the film to the target substrate can preferably be achieved.

In order to increase the contact area of the target substrate with the coating of the starting substrate, the target substrate and/or the starting substrate can be exposed to vibrations or excited to mechanical oscillations.

According to a further embodiment, the transfer and fixing of the material from the starting substrate to the target substrate can also take place without direct contact between the substrates. In particular, the transfer of the material from the starting substrate to the target substrate can take place by ablation mechanisms. For example by evaporating some of the monomer particles, of the monomer film, of the starting substrate, of the optional at least one intermediate layer or of a specific additive by means of electromagnetic radiation, so that material is transported from the starting substrate to the target substrate by the expansion in volume. As already described, direct contact between the starting substrate and the target substrate is not absolutely necessary in this case, but it is not excluded.

The expansion in volume can be caused, for example, by thermal expansion, plasma formation, evaporation or the decomposition of a substance. The decomposition of a substance can take place, for example, by photolytic decomposition, for example by the use of photopolymers, or thermal decomposition. Furthermore, the electromagnetic radiation or a temperature increase generated by the electromagnetic radiation can cause a chemical reaction which either results directly in an expansion in volume or leads to a temperature rise and thus, via thermal effects, results in an expansion in volume. This can take place, for example, by the use of an intermediate layer which comprises compounds from the group of heavy metal azide salts, trinitrotoluene or other aromatic compounds having nitro groups and their salts, compounds and polymers into which aromatic compounds with nitro groups are integrated, polymers with nitro groups, such as, for example, nitroglycerine, nitropenta, cellulose nitrate, nitroguanidine, nitramines, hexanitrostilbene, nitrotriazolone, acetylide salts, mixtures of individual or different explosives with stabilizing substances, plastic explosives, organic azides, ethylene glycol, dinitrates, gunpowder, binary explosives, ammonium nitrate, nitromethane and mixed explosives with nitrate salts.

In a further embodiment, the above-described expansion in volume results, with a suitable choice of the at least one intermediate layer, such as, for example, polyimide, and of the material layer, in the formation of a bubble which transports the material to be transferred towards the target substrate.

The transferred material is fixed to the target substrate by the locally limited introduction of energy by means of electromagnetic radiation. As already described, direct or indirect heating of the material takes place. The parameters of the radiation source, such as the wavelength, energy, pulse duration, focus size and focal plane, can be changed for that purpose, or a suitable second radiation source is used.

Alternatively, fixing of the material to the target substrate is achieved solely by a suitable choice of the polymer matrix material and/or target substrate material, so that they adhere or bond to one another upon contact.

The transfer of the material from the starting substrate to the target substrate can also take place in that monomer particles or the material of a monomer film is or are detached from the starting substrate by means of a photon-transmitted pulse and moved towards the target substrate. Alternatively, parts of the starting substrate and/or added additives can be accelerated by the pulse and in turn transmit their pulse. Fixing of the material to the substrate takes place as described above.

According to the invention, the transfer of the material from the starting substrate to the target substrate can also take place by means of the optical tweezers principle. This means, for example, the monomer particles are transparent for the wavelength of the radiation source that is used and are retained or moved by the pulse transfer of the photons on refraction at the particles.

According to a further embodiment, the transfer of the material from the starting substrate to the target substrate can also take place or be assisted by generating an electric field between the two substrates. In this case, the matrix material must previously be charged by a suitable method, for example triboelectrically or by a corona wire, as a result of which, in the case of monomer particles, they are guided towards the target substrate by the electric force.

The transfer of the material from the starting substrate to the target substrate can further also take place or be assisted by generating a magnetic field between the two substrates. In this case, the matrix material must comprise a magnetic constituent, such as, for example, magnetite. In this case, the monomer particles, for example, are guided towards the magnetic field gradient by the magnetic force.

In order to reduce adhesion forces between the monomer particles and/or between the matrix material and the substrates and facilitate the transfer, it is preferred that the space between the substrates and/or between the monomer particles is filled with a liquid.

As already described above, according to a further embodiment of the present invention the patterning of the target substrate with different monomers for combinatorial synthesis is achieved by removing particles at defined sites by means of electromagnetic radiation and thus permitting access to those sites. According to this embodiment, a plurality of discrete spots of the target substrate are covered with particles which block access thereto.

According to this embodiment, wherein the plurality of discrete spots of the target substrate are covered with blockade particles which block access thereto, step (ii) of conditioning selected spots comprises selectively removing the blockade particles arranged in those spots by means of electromagnetic radiation, whereby access for the at least one monomer to those selected spots is made possible.

The discrete spots of the target substrate preferably have wells. The substrate used as the target substrate is in particular a substrate that is so covered with particles that they block access to defined sites on the substrate, that is to say cover the wells. These particles are also called blockade particles in the following. Suitable substrates are in particular pre-patterned substrates with wells into which one or more blockade particles fit as accurately as possible. Because the particles can be retained in the wells inter alia by means of capillary forces, the wells of such pre-patterned substrates can be filled particularly simply and completely with one or more particle(s).

According to the present invention, these blockade particles should on the one hand block access to the mentioned wells as efficiently as possible, so that no further particles or substances can be deposited therein, and on the other hand they must be capable of being selectively removed from selected wells. According to the invention, the removal of the blockade particles takes place by means of electromagnetic radiation, which is preferably a short laser pulse. As a result, the free wells can then selectively be brought into contact with at least one monomer. According to a further embodiment, the monomer can be provided in the form of a monomer particle. For example, the wells can be filled with such monomer particles. As already defined above, these comprise suitable monomers or monomer mixtures for the combinatorial synthesis of the target molecules. The monomer particles comprise the at least one monomer and optionally further substances in a polymer matrix. They consist substantially of the polymer matrix in which suitable chemical components or monomers for the combinatorial synthesis of molecule arrays, in particular peptide or oligonucleotide arrays, are embedded.

If wells are then freed in succession of blockade particles by means of the laser, the free wells can be filled with different types of monomer particles, which differ in particular in that they contain different types of monomers for the combinatorial synthesis.

After patterning of the substrate with monomer particles has been carried out in that manner, the monomers suitable for the combinatorial synthesis of molecule arrays, in particular of peptide or oligonucleotide arrays, must be mobilized so that they are able to diffuse to the substrate surface, where they react with suitable functional groups. This mobilization can take place, for example, as described in EP 1 140 977 B1. As examples of how the monomers can react at the substrate surface there may be mentioned amino acid derivatives activated C-terminally with OPfp esters or via acid anhydrides, which react with free amino groups of the substrate, whereby peptide arrays form, or phosphoramidites, which react with OH groups, whereby oligonucleotide arrays form. The above-described embodiment of the present invention is shown schematically in FIG. 1.

If the monomer particles contain precursors of monomers, dimers or trimers suitable for a combinatorial synthesis, the molecules bound to the substrate can be extended by further monomers, dimers or trimers by one or more further cycles of coupling reactions. It is also possible to modify the monomers bound to the substrates by one or more further cycles of reactions which are not necessarily identical. When the synthesis has been carried out, the protecting groups can be cleaved from the synthesized oligomers, wherein the synthesized molecules remain bound to the substrate and are optionally available for the subsequent coupling step.

According to the invention it is possible to use protecting group techniques known in the prior art, which are well established in particular in the field of the synthesis of biomolecules such as peptides, oligosaccharides or nucleotides and in combinatorial chemistry in general. That is to say, according to the present invention, one or more protecting group(s) which are optionally present in a monomer for combinatorial synthesis can be removed at a suitable point in the method in order to permit further coupling steps.

According to the present invention, various materials can be used as the target substrate, such as, for example, polystyrene films, paper, CDs, MODs, DVDs or FMDs. Particularly suitable are functionalized glass substrates, such as, for example, glass wafers, which have on one surface a patterning produced, for example, by means of a lithographic method. Porous glass substrates can also be used according to the invention.

According to a further preferred embodiment, the wells of the target substrate are blocked by the blockade particles in such a manner that this spot is no longer accessible for added monomers, that is to say the monomer in question is unable to penetrate into those wells even by diffusion, for example. In this embodiment of the method according to the invention, the spots freed of the blockade particles do not necessarily have to be filled with monomer particles, but the substrate can instead be brought into contact locally or wholly with a suitable monomer for combinatorial synthesis. These monomers are preferably applied to the substrate in a suitable solvent so that, by means of convection, diffusion or via the gas phase, they are able selectively to reach the wells freed of the blockade particles, where they are able to react with suitable functional groups of the reactants immobilized there. There may be mentioned as suitable solvents, for example, dimethylformamide, N-methyl-2-pyrrolidone or dimethyl sulfoxide for peptide synthesis or acetonitrile for the synthesis of oligonucleotides.

In this embodiment of the method according to the invention, higher requirements are made of the blockade particles, because the blockade particles must here prevent the already mobilized monomers (in contrast to the mentioned monomer particles) from passing into the wells, for example by diffusing through the blockade particles. This can be achieved, for example, in that the blockade particles consist of a very dense material, such as, for example, silicon dioxide, or are crosslinked sufficiently to suppress diffusion through the blockade particles. Crosslinked polystyrene particles may be mentioned as an example of blockade particles of crosslinked material.

In order that the wells are reliably blocked and no monomers find their way past the blockade particles into the wells, a narrow size distribution of the blockade particles is necessary in particular. It is further possible to increase the diameter of the blockade particles later in order to close the wells tightly. This can take place, for example, by swelling the particles in solvents or by osmosis.

Particular preference is given to blockade particles with a very narrow size distribution which additionally have a strong surface charge. This strong surface charge has the effect that the particles in polar solvents bear a large, largely immobile shell of polar molecules, such as, for example, a hydrate shell in water, so that, in the swelled state, they close off access to the mentioned wells very tightly like a stopper. According to a preferred embodiment of the present invention, the blockade particles can additionally be further sealed with oppositely charged nanoparticles before they are brought into contact with the mentioned monomers for combinatorial synthesis.

According to the present invention, these various possibilities for sealing can be reversible so that, after the chemical coupling of a first monomer at selected first sites or spots, further blockade particles at selected second sites or spots can selectively be removed. To that end, added nanoparticles can first be washed away, or blockade particles swelled in liquids can be incubated in liquids having different swelling parameters, so that the diameter of those particles shrinks sufficiently that they can reliably be removed from the well by means of electromagnetic radiation, such as, for example, by means of a laser pulse. It is also possible for the swelled blockade particles to simply be dried.

Figure 2:
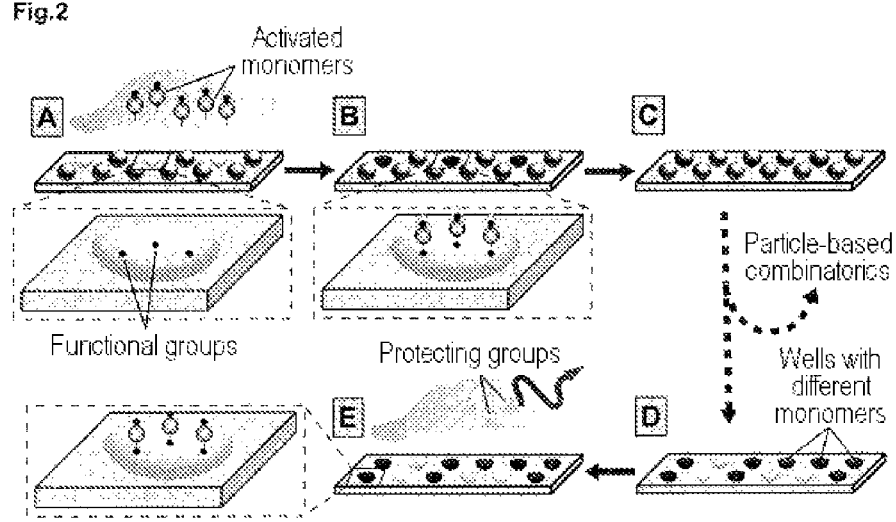

According to a further embodiment, the method defined above further comprises a step (iv) of depositing blockade particles in order to cover the previously exposed spots with blockade particles again (as shown schematically in FIG. 2).

According to a further embodiment of the method defined above, the steps of conditioning the selected spots (step (ii)) and of reacting the at least one monomer with reactants present in immobilized form in the selected spots of the target substrate (step (iii)) and optionally of further depositing blockade particles on previously exposed spots (step (iv)) are carried out iteratively using in each case identical or different monomers. It is thereby possible to produce high-density molecule arrays inexpensively and efficiently.

According to the present invention, the principles of the combinatorial structuring of particles, in which blockade particles on the target substrate are first removed selectively by means of electromagnetic radiation in order to permit access to those spots, or the selective transfer and fixing of the material that comprises the at least one monomer from a starting substrate to the target substrate, can additionally advantageously be combined.

According to the present invention there are suitable as the source for the electromagnetic radiation that is used in particular lasers, such as, for example, pulsed lasers or continuous-wave lasers. In order to focus the radiation site-specifically at a point, a suitable lens system is necessary. The target substrate and/or the starting substrate can be displaced mechanically relative to the radiation source, or the electromagnetic radiation is positioned via suitable mirrors. This has the advantage that a larger number of points can be processed per unit time.

In order to increase the speed of the method, a plurality of radiation sources can preferably be used in parallel or the beam of one radiation source is divided into at least two part-beams by a suitable system, such as, for example, a lens array or a mirror array. The part-beams can be modulated individually in their intensity.

According to the invention there is further provided a high-density molecule array having a pitch of ≤300 µm which is obtainable by the method described above. According to the present invention, the pitch of the molecule array is preferably ≤200 µm, more preferably ≤150 µm and particularly preferably ≤100 µm.

As mentioned above, the arrays according to the invention are preferably peptide or oligonucleotide arrays, in particular peptide arrays.

The present invention is based on the patterning of particles on a substrate by means of electromagnetic radiation in order to permit the combinatorial synthesis of high-density molecule arrays, in particular peptide or oligonucleotide arrays. The electromagnetic radiation thereby acts directly upon the particles and thus controls the force with which the particles are moved. In one embodiment, the monomers as monomer particles are patterned directly in that monomer particles are transferred directly to the spots of a substrate and selectively fixed there. According to another embodiment, particles are selectively removed from a substrate so that the free sites (spots) then become accessible to monomers for the synthesis of molecule arrays, in particular peptide or oligonucleotide arrays. The monomers can be applied to those sites in a liquid, in the gas phase or in the form of monomer particles.

Because the smallest pitch for the particle deposition is limited only by the particle size, the focus diameter of the electromagnetic radiation and the size of any structures, such as, for example, wells, on the substrate, particle patterns having a pitch of ≤300 µm, in particular up to ≤100 µm, can advantageously be produced.

In addition, there is very great flexibility according to the invention regarding the number of chemical components used. If the number thereof is increased, this can be incorporated into the existing method without additional outlay, for example in terms of calibration.

Particle reservoirs are not used in the present invention. The deposition of blockade particles on a substrate, or coating with monomer particles or a monomer film, takes place in a separate process step. Insufficiently coated substrates, for example, can thus be separated out or treated again. Problems and delays in the process, caused by variations in the coating quality, as occur in particular in the selective coating of high-voltage CMOS chips, can thus advantageously be eliminated. The method according to the invention is accordingly very robust.

Moreover, the area of the particle patterns that are produced is in principle not limited, because very large substrates can in principle also be treated by deflecting the electromagnetic radiation with mirrors, as well as a mechanical method.

The method according to the invention combines the advantages of lithographic methods (very small structures which lead to very small peptide or oligonucleotide spots) and particle-based methods (simple patterning over larger areas is possible owing to self-organization; robustness; the patterning and the coupling reaction on the substrate are separated in terms of time and spatially), but at the same time avoids the disadvantages thereof (secondary reactions due to the many coupling reactions carried out in sequence in the case of lithographic techniques, and large pitches in the case of the particle-based techniques hitherto employed).

Because the present invention allows particle patterns having a very small pitch, that is to say having a very high resolution and on a very large area, to be produced, the molecule arrays produced thereby can accordingly be used extremely efficiently in high-throughput screenings. In high-throughput screenings it is important to test as many different molecules as possible in parallel and inexpensively for specific properties.

Owing to the virtually unlimited number of monomers which can be used in the method according to the invention, the variety of molecule arrays produced can be increased, which in turn renders them more interesting for a wide variety of high-throughput screenings.

The present invention and further advantages arising therefrom will be explained in greater detail in the following description with reference to the embodiments described in the examples.

The figures show:

FIG. 1 A) A substrate with wells, which is suitable for the combinatorial synthesis of peptide or oligonucleotide arrays, is brought into contact with chemically inert blockade particles. B) The blockade particles are deposited in the wells. C) By means of a laser, blockade particles are removed from selected wells in order to allow monomer particles to be deposited therein in the next step.

FIG. 2 A) The wells of a substrate have functional groups which are able to react with monomers for the combinatorial synthesis of oligonucleotides or peptides. A laser has removed the grey blockade particles from some wells so that the sites thereby exposed can come into contact with the activated monomers. B) The monomers couple to the exposed wells. C) The wells are then filled with blockade particles again. D) This procedure is repeated for further wells with different monomers. E) If the transient protecting group (e.g. Fmoc or tBoc in the case of peptide arrays, or trityl in the case of oligonucleotide arrays) is then removed, a further layer of monomers is able to couple to the monomers already applied (Merrifield synthesis).

Figure 3:
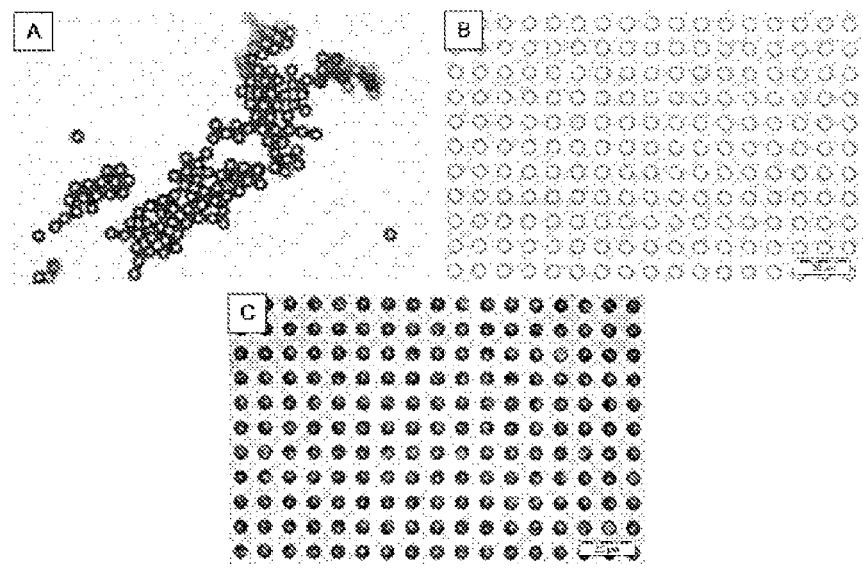

FIG. 3 Introduction of particles into the wells of a patterned substrate. A) Blue-colored particles of polystyrene (shown as dark particles), diameter 4.2±0.11 μm (Micro Particles GmbH); B) Structured substrate with cylindrical wells, diameter 6 μm, pitch 10 μm; C) The wells were filled completely with particles.

Figure 4:
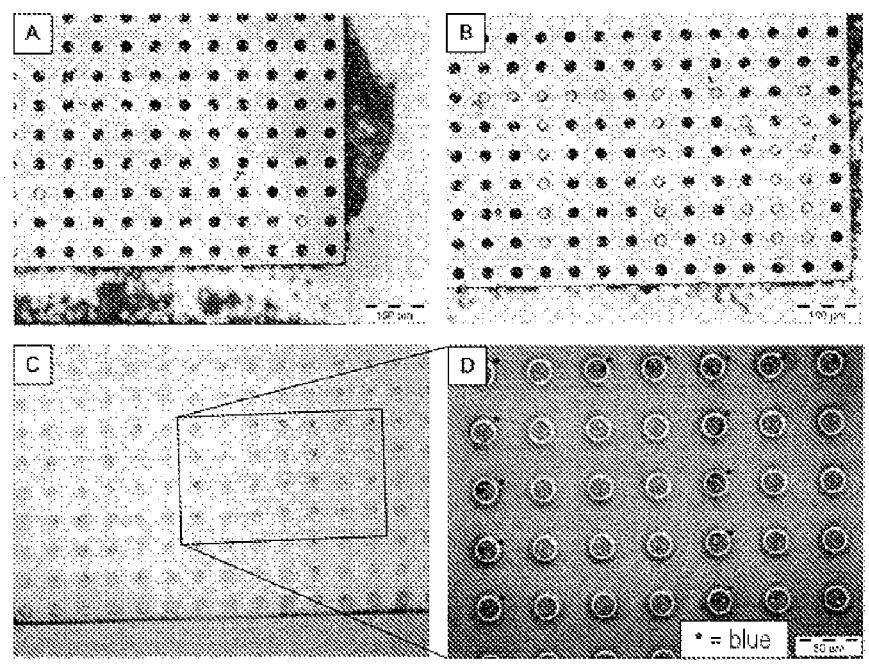

FIG. 4 A) SU-8 wells, diameter 20 μm, filled with red polystyrene particles (shown as dark particles), diameter 10 μm; B) Wells were selectively emptied by means of a pulsed laser so that the lettering "KIT" is revealed (mirror-inverted because transmitted-light image); C) Free wells were filled with blue polystyrene particles, while the other wells were blocked by the red particles; D) Detailed image of the combinatorial pattern of red and blue particles (wells with blue particles are marked "*" for clarity).

Figure 5:
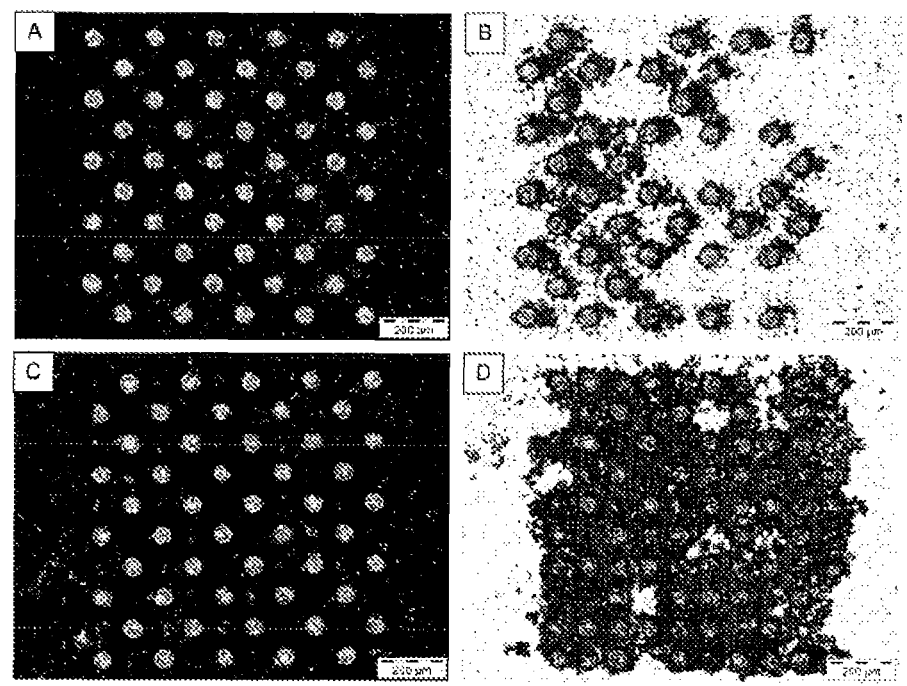

FIG. 5 Transfer of material from a particle layer from a PDMS starting substrate to a target substrate, A) starting substrate and target substrate are in contact, dot pattern was produced by heating with a laser, B) target substrate with transferred material, C) target substrate is in contact with second starting substrate, a second dot pattern was produced by heating with a laser, D) target substrate with material from the first and second transfer.

Figure 6:
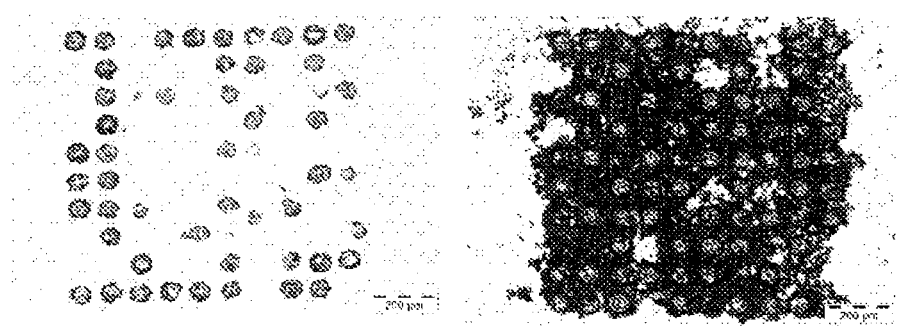

FIG. 6 Target substrate before (left) and after (right) cleaning in an ultrasound bath. Contamination in non-irradiated regions could thus be reduced significantly.

Figure 7:
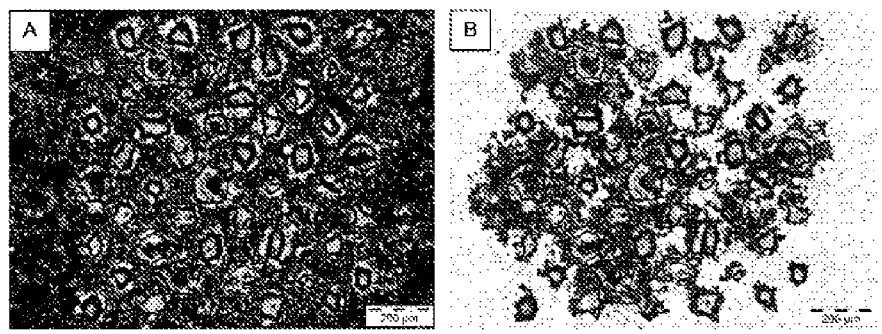

FIG. 7 A) Target substrate with particle layer transferred from the starting substrate by means of an electric field. Specific regions were selectively fixed with the laser, B) after removal of the particle layer by means of compressed air.

Figure 8:
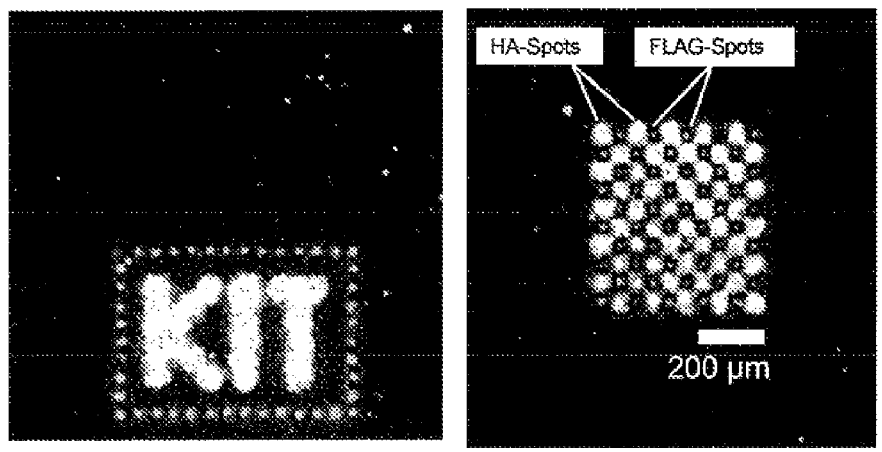

FIG. 8 Fluorescence-labeled peptides (HA: light, FLAG: dark), synthesized by means of laser-based particle patterning, left: KIT from FLAG spots with frame of HA spots, right: FLAG and HA in a checkerboard pattern.

Figure 9:
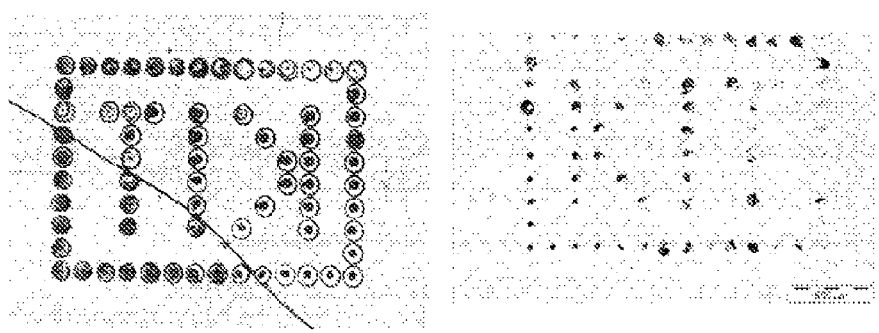

FIG. 9 Transfer of amino acid derivatives embedded in a copolymer matrix from a solid monomer film to a target substrate of glass, A) starting substrate: reflected-light microscope image, monomer film with missing material, B) target substrate: transmitted-light microscope image, glass substrate with pattern of transferred material.

Figure 10:
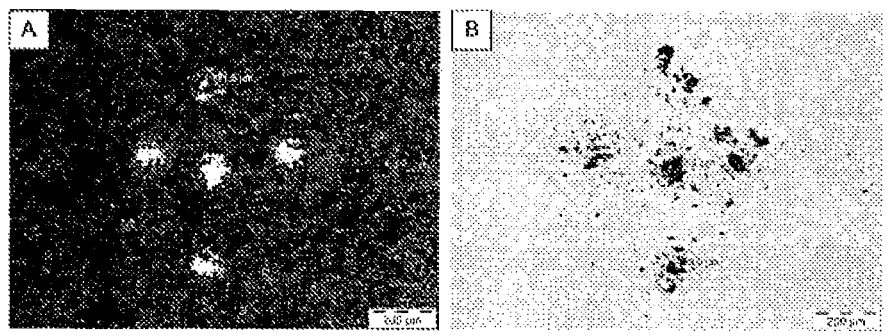

FIG. 10 Laser ablation with a pulsed laser, A) starting substrate with particle layer, B) target substrate with monomer particles transferred site-specifically.

Figure 11:
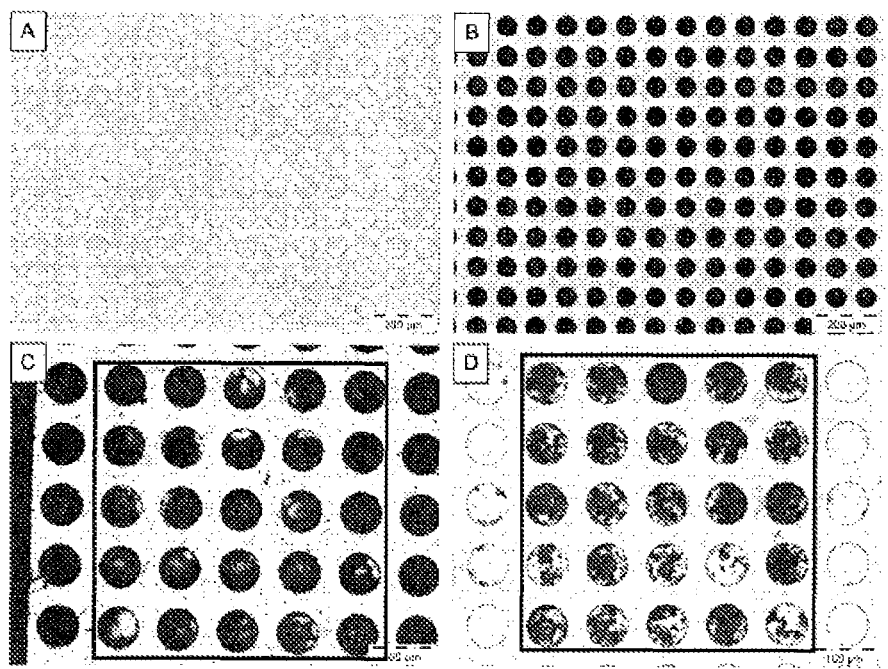

FIG. 11 Transfer of particles between two structured substrates; A) substrate with cylindrical wells, diameter 70 μm, pitch 100 μm, depth about 40 μm; B) wells filled with particles; C) patterned starting substrate after laser transfer, 5×5 wells are partially emptied, D) patterned target substrate after laser transfer, 5×5 structures are filled with particles.

Figure 12:
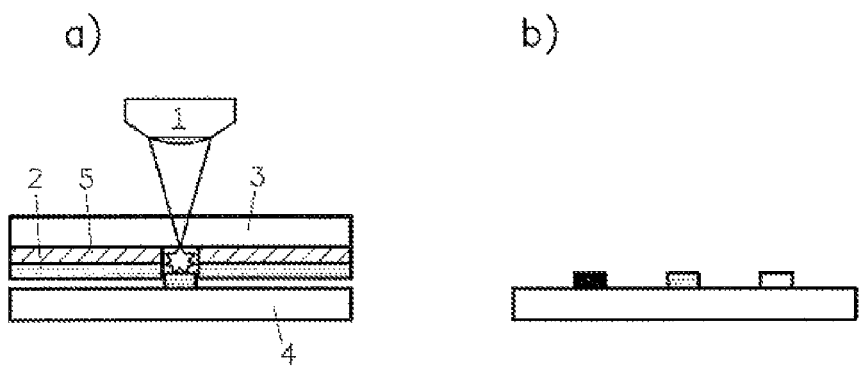

FIG. 12 Schematic drawing. a) By means of a laser (1), material from a monomer film (2) is transferred from a starting substrate (3) to a target substrate (4). Between the monomer film and the starting substrate there is an intermediate layer (5). b) After a plurality of iterations with different starting substrates, a pattern of different monomers in the form of discrete spots forms on the target substrate.

Figure 13:
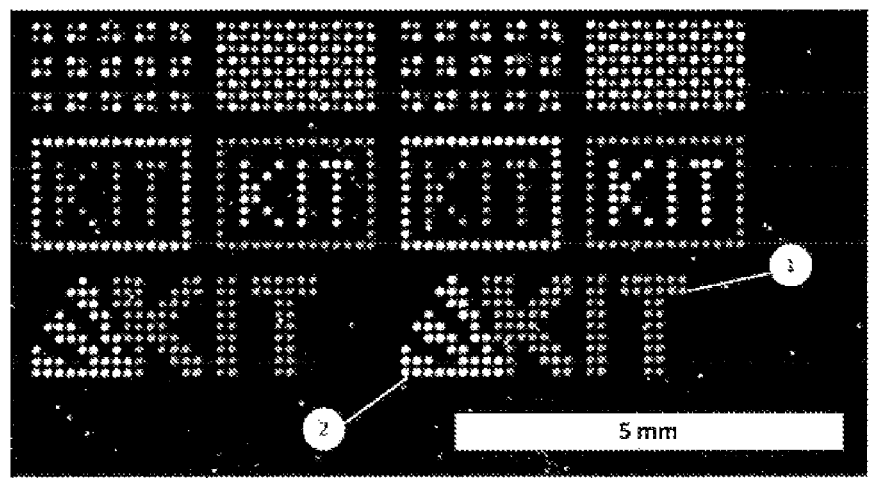

FIG. 13 Fluorescence images of a peptide array with a pitch of 150 μm consisting of the peptides FLAG and HA. The array was detected with fluorescence-labeled anti-HA (1) and fluorescence-labeled anti-FLAG (2).

Figure 14:
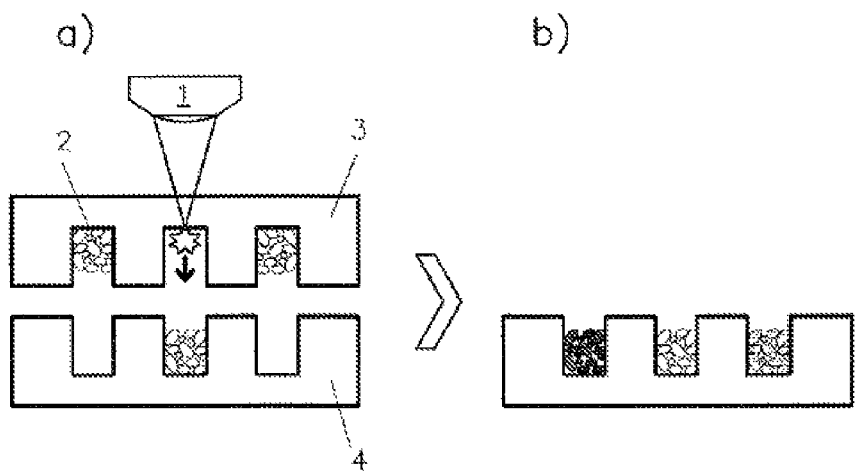

FIG. 14 Schematic drawing. a) By means of a laser (1), material in the form of particles from a particle layer (2) is transferred from a starting substrate having a micropatterned surface (3) to a target substrate having a micropatterned surface (4). b) After a plurality of iterations with different starting substrates, a pattern of different monomers in the form of discrete spots forms on the target substrate.

Figure 15:
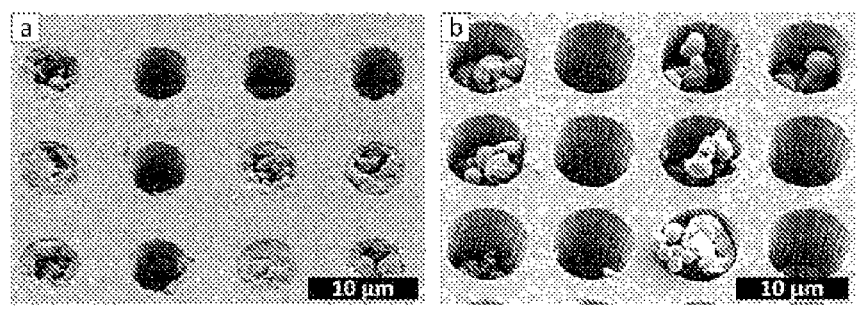

FIG. 15 Images using a scanning electron microscope. a) Starting substrate of glass having a micropatterned surface with wells (depth 10 μm, diameter 5 μm, pitch 10 μm) covered with particles. The particles from some of the wells were transferred to another substrate by means of laser radiation. b) Target substrate of glass having a micropatterned surface with wells (depth 10 μm, diameter 7 μm, pitch 10 μm). Particles were transferred into some of the wells from a starting substrate by means of laser radiation.

Figure 16:
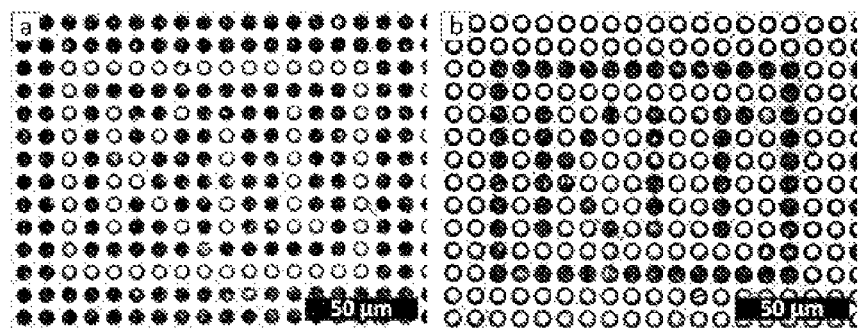

FIG. 16 Transfer of material in the form of monomer particles with cysteine between micropatterned glass substrates with pitch 10 μm. a) Starting substrate filled with cysteine particles, diameter of the wells 5 μm. b) Target substrate with transferred particles, diameter of the wells 7 μm.

Figure 17:
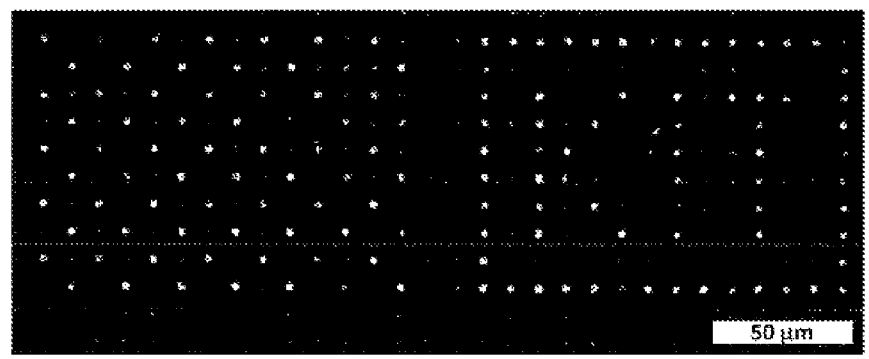

FIG. 17 Fluorescence image of biotin spots on a target substrate of glass having a micropatterned surface. The biotin spots were detected with fluorescence-labeled streptavidin. Spot size 7 μm, pitch 10 μm, spot density 1,000,000 $cm^{-2}$.

Figure 18:
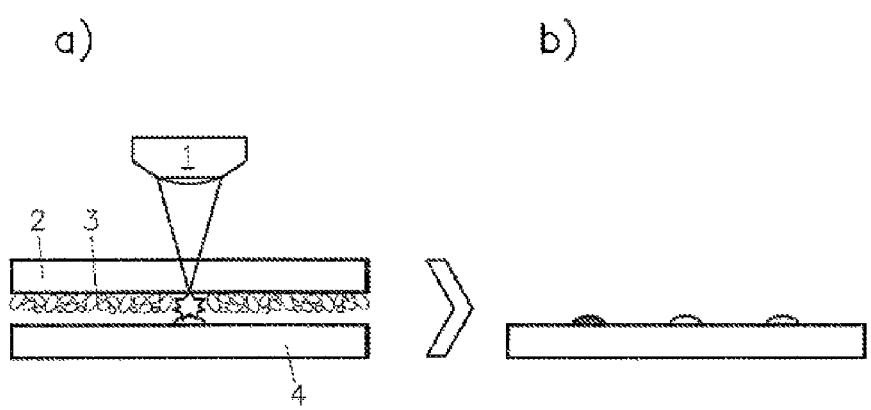

FIG. 18 Schematic drawing. a) By means of a laser (1), material from a starting substrate (2) is transferred in the form of particles from a particle layer (3) onto a target substrate (4). b) After a plurality of iterations with different starting substrates, a pattern of different monomers in the form of discrete spots forms on the target substrate.

Figure 19:
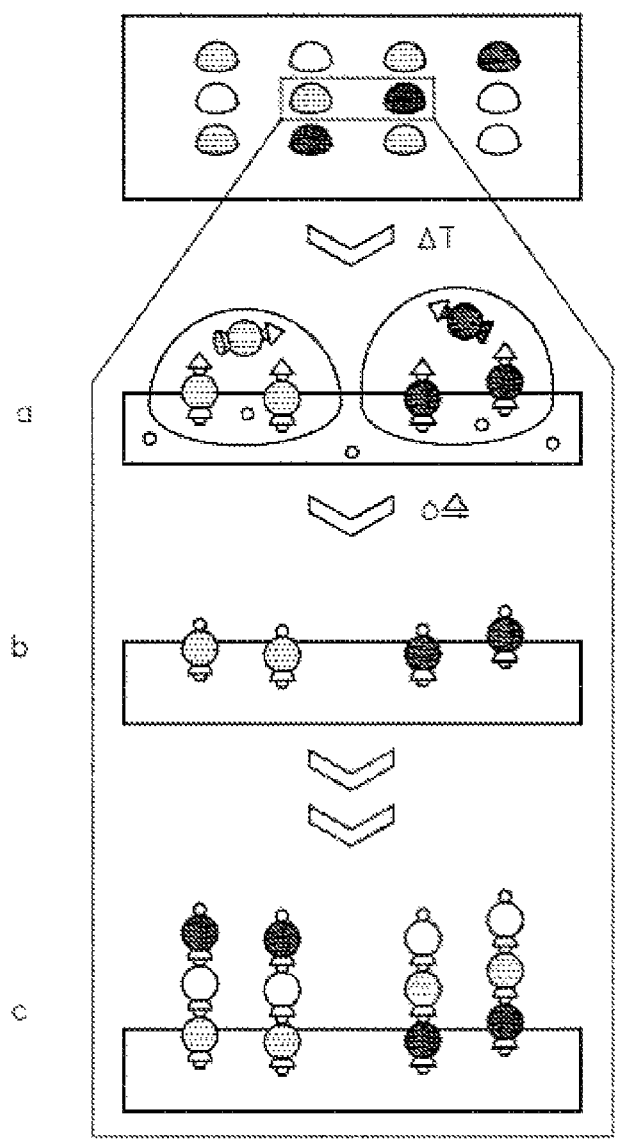

FIG. 19 Synthesis of a peptide array starting from a target substrate on which material with different amino acid derivatives in a combinatorial pattern has been placed. a) The substrate is heated so that the polymer matrix of the material melts and the amino acid derivatives are able to diffuse to the substrate surface, where they bind chemically.

b) The polymer matrix and excess monomers are removed in various washing steps. Free amino groups are blocked and the N-terminal protecting group at the amino acids is removed. c) By repeatedly carrying out the process, a peptide array forms.

EXAMPLES

The following examples show experiments relating to the concept of blockade particles (see (1) and (2)), various experiments relating to the transfer of monomer particles (see (3), (4), (7) and (9)) and to the transfer of material from a monomer film (see (6)). In addition, examples of the synthesis of molecule arrays are shown (see (5) and (8)).

(1) Deposition of Particles in Wells

Commercially acquired polystyrene particles having a diameter of 4.2±0.11 µm (see FIG. 3A) were applied in an aqueous suspension to a patterned substrate (see FIG. 3B). The substrate is a glass wafer on which photoresist SU-8 has been patterned by a lithographic method. A regular pattern of cylindrical wells was produced. The diameter of the wells is 6 µm and the midpoint to midpoint spacing (also called the pitch) is 10 µm. The wells are about 17 µm deep, which corresponds to the thickness of the SU-8 layer on the glass wafer. As can be seen in FIG. 3D, the wells of the substrate are reliably filled with the polystyrene particles. Selective emptying of the structures using a pulsed laser is then possible (see also section 2).

(2) Combinatorial Pattern of Different Particles

Commercially acquired red-colored polystyrene particles having a diameter of 10 µm were applied in an aqueous suspension to a patterned substrate (see FIG. 4A). The substrate is a glass wafer on which photoresist SU-8 has been patterned by a lithographic method. A regular pattern of cylindrical wells of diameter 20 µm, pitch 50 µm and depth about 40 µm was produced. Because the diameter and depth of the wells are significantly larger than the diameter of the particles, several particles are present in each well. Some wells were selectively emptied using a pulsed laser so that the lettering "KIT" is revealed, as can be seen in FIG. 4B. In the next step, blue-colored polystyrene particles (diameter 10 µm) were applied from aqueous suspension. The red polystyrene particles acted as blockade particles and prevented the blue particles from being deposited, so that they were able to be deposited only in the free wells (see FIGS. 4C and D).

(3) Combinatorial Transfer of Monomer Particles from a PDMS Starting Substrate to a Glass Specimen Slide According to the Diagram Shown in FIG. 18

Monomer particles (mean diameter about 8.8 µm) consisting of a styrene-acrylate copolymer and graphite nanoparticles were deposited from an aerosol on a substrate of polydimethylsiloxane (PDMS). This substrate served as the starting substrate and was brought into contact, with slight mechanical pressure, with a target substrate of glass. Using a laser (wavelength 810 nm, power up to 100 mW, focus diameter 7.5 µm), specific regions were heated selectively for in each case 10 ms (see FIG. 5A). As can be seen in FIG. 5B, the melted regions remain on the target carrier after separation of the two substrates. These steps were repeated successfully with a second starting substrate (FIGS. 5C and D). A total of about 85% of the irradiated spots was thus transferred.

Particle contaminations in the non-irradiated regions of the target substrate were removed now and then with compressed air, but this was not wholly successful. Instead, as is shown in FIG. 6, an ultrasound bath can also be used, with which almost complete removal of the contaminations is achieved.

(4) Transfer of Microparticles by Means of an Electric Field and Selective Fixing with Laser Radiation Monomer particles (mean diameter about 8.8 µm) of a styrene-acrylate copolymer and graphite nanoparticles were applied from an aerosol to a starting substrate of glass. The particles were electrically charged due to the friction that occurred in the aerosol generator. The target substrate of glass was then positioned parallel to the starting substrate at a distance of about 160 µm. By applying an electric field, some of the particles were transferred to the target substrate, so that a closed particle layer formed thereon. Using a laser, specific regions of the particle layer were selectively irradiated (see FIG. 7A). The particle layer on the target substrate was then removed using compressed air. The heated regions of the particle layer remained on the target substrate (see FIG. 7B). This principle could be repeated a second time, wherein different regions of the target substrate were irradiated.

(5) Combinatorial Synthesis of Peptides with Laser-Structured Monomer Particles

It has been possible to show by experiment that peptides can be synthesized by means of amino acid particles which have been patterned on a substrate by means of a laser.

The two peptides FLAG (amino acid sequence: Asp-Tyr-Lys-Asp-Asp-Asp-Asp-Lys) and HA (amino acid sequence: Tyr-Pro-Tyr-Asp-Val-Pro-Asp-Tyr-Ala) were chosen for the experiment. Monomer particles (mean diameter about 5 µm) produced from a styrene-acrylate copolymer as matrix, amino acid derivatives and graphite as absorber were deposited from the aerosol on a functionalized glass substrate. Using a laser (wavelength 810 nm, power up to 100 mW, focus diameter 7.5 µm, pulse duration 10 ms), the particles were selectively heated and thus fixed to the substrate. Particles that were not fixed were removed with compressed air. This laser patterning was carried out with the corresponding monomer particles for the first amino acid of the FLAG peptide and also for the first amino acid of the HA peptide. The process steps shown schematically in FIG. 19 were then carried out. The substrate was heated for 90 minutes at 90° C. in a nitrogen atmosphere. The amino acid derivatives in the matrix diffuse during this time to the substrate, where they couple chemically to the $NH_2$ groups that are present.

The copolymer matrix, excess amino acids and all other constituents were then removed by washing with dimethylformamide (DMF). Free $NH_2$ groups were blocked, and the Fmoc protecting groups at the C-terminal ends of the amino acids were then removed.

The process was carried out several times, with the amino acids according to the sequence, until the peptides were synthesized completely. In order to check the synthesis products, the substrate was then labeled with fluorescence-labeled anti-HA antibodies and with fluorescence-labeled anti-FLAG antibodies (see FIG. 8).

(6) Transfer of Material from a Cohesive Film

The procedure shown in the diagram of FIG. 12 was followed in order to transfer material from a monomer film. Contrary to FIG. 12, the laser in this experiment was positioned behind the target substrate, so that the laser beam acted on the starting substrate through the target substrate. Furthermore, no intermediate layer was used in this experiment.

First of all, a cohesive monomer film was produced on a starting substrate of glass by heating a mixture of styrene-acrylate copolymer, Fmoc-glycine-Opfp ester and graphite nanoparticles and applying it smoothly with a doctor blade. After cooling, the starting substrate was brought into contact with the target glass substrate and irradiated with a laser (wavelength 810 nm, power 100 mW, pulse duration 10 ms, laser focus diameter 7.5 µm). After separation of the two substrates, it is clear that material has successfully been transferred from the monomer film (see FIG. 9A) to the target substrate (see FIG. 9B).

(7) Transfer Between Two Patterned Substrates According to the Diagram Shown in FIG. 14

In this experiment it has been shown that it is possible purposively to transfer particles from a patterned starting substrate to a patterned target substrate using a laser. The substrates are glass wafers on which a photoresist (photoresist SU-8) has been patterned by a lithographic method. A regular pattern of cylindrical wells was produced (see FIG. 11A). The diameter of the wells is 70 µm and the midpoint to midpoint spacing (pitch) is 100 µm. The wells are about 40 µm deep, which corresponds to the thickness of the photoresist layer on the glass wafer. The wells of the starting substrate were filled by means of a doctor blade with particles of a styrene-acrylate copolymer and 2% graphite (mean diameter 2.5 µm, production by spray drying) and the substrate surface was cleaned of excess particles (see FIG. 11B). The starting substrate was positioned on a target substrate and the two hole matrices were brought into line. 5×5 wells were then treated from above with a pulsed laser (wavelength 532 nm, pulse energy about 50 µJ, pulse duration about 10 ns). The wells of the starting substrate were thereby partially emptied (see FIG. 11C) and the wells of the target substrate filled (see FIG. 11D).

FIG. 15 shows scanning electron microscope images of micropatterned glass substrates which were produced by a dry etching method. The cylindrical wells have a depth of about 8 µm and a pitch of 10 µm. FIG. 15a shows a starting substrate. A layer of gold several nanometers thick was applied to the substrate by a sputtering process. The wells were then filled with particles by the doctor blade technique already described. In addition, the starting substrate was heated briefly in order to sinter the particles together. Some of the wells are empty because the particles have already been transferred to another substrate by means of a laser pulse. FIG. 15b shows a target substrate with the transferred particle material. The particles of FIG. 15 consist of a styrene-acrylate copolymer and comprise biotin as a chemical constituent.

FIG. 16 shows optical microscope images of the transfer of a complex pattern of particles comprising the amino acid cysteine between two micropatterned glass substrates having cylindrical wells with a pitch of 10 µm (dark: wells filled with material, light: empty wells). FIG. 16a shows the starting substrate (diameter of the wells about 5 µm) and FIG. 16b shows the target substrate (diameter of the wells about 7 µm).

FIG. 17 shows a fluorescence image of biotin spots having a pitch of 10 µm on a target substrate (left: checkerboard pattern, right: letters KIT). In order to produce the pattern, particles of a styrene-acrylate copolymer with biotin-OPfp ester were transferred between two micropatterned glass substrates according to the diagram shown in FIG. 14. The starting substrate was provided with a gold layer several nanometers thick by a sputtering process, before the microwells were filled with particle material by a doctor blade process.

For the transfer, a pulsed laser having a wavelength of 532 nm was used. The target substrate was provided with an amino functionalization. In order to achieve the chemical coupling of the biotin-OPfp ester to the target substrate after the transfer, the substrate was heated under an inert gas atmosphere to above the glass transition temperature of the styrene-acrylate copolymer. Excess material was then removed in various washing steps using dimethylformamide and acetone, and the substrate was brought into contact with a solution of fluorescence-labeled streptavidin.

(8) Synthesis of Molecule Arrays

The procedure according to the diagram shown in FIG. 12 was followed in order to synthesize a peptide array with the amino acid sequences Tyr-Pro-Tyr-Asp-Val-Pro-Asp-Tyr-Ala (hemagglutinin or HA) and Asp-Tyr-Lys-Asp-Asp-Asp-Asp-Lys (FLAG) having a pitch of 150 µm.

As the starting substrate there were used glass specimen slides provided with an intermediate layer of polyimide in the form of a self-adhesive Kapton film from DuPont. The corresponding amino acid derivatives and a styrene-acrylate copolymer (SLEC PLT-7552, Sekisui Chemical GmbH) were then dissolved in dichloromethane and applied by spin coating. The finished prepared starting substrates were placed directly onto the amino-functionalized target substrates, as shown in FIG. 12, and irradiated through the starting substrates from above using a laser (wavelength 532 nm, laser power 300-400 mW, laser pulse duration about 5 ms, laser focus diameter about 20 µm). Material with amino acid derivatives was thereby transferred to the target substrates. The transfer was repeated with different starting substrates with amino acids according to the above-mentioned sequences of the peptides FLAG and HA.

After the transfer of each layer of the array, the target substrate was heated for 90 minutes at 90° C. under an argon atmosphere in order to couple the amino acids to the target substrate. The target substrate was washed with a mixture of N,N-dimethylformamide, diisopropylethylamine and acetic anhydride in order to remove excess amino acids and the polymer matrix and in order to block free amino groups on the substrate. The fluorenylmethoxycarbonyl protecting groups were then removed from the amino acids with a solution of piperidine in N,N-dimethylformamide. After completion of the peptide sequences, the side chain protecting groups were removed with trifluoroacetic acid.

FIG. 13 shows a fluorescence image of the peptide array after detection of the peptides with fluorescence-labeled specific antibodies (anti-FLAG Cy3 and anti-HA Cy5).

(9) Ablation and Transfer of Monomer Particles with Laser Pulses According to the Diagram Shown in FIG. 18

A starting substrate of glass covered with a layer of monomer particles was subjected to laser pulses (wavelength 532 nm, pulse energy about 50 µJ, pulse duration about 10 ns). Monomer particles from the layer could thus be removed (see FIG. 10A). A second glass specimen slide which was positioned at a distance of about 170 µm served as the target substrate, on which the particles are deposited again (see FIG. 10B).

The invention claimed is:

1. A method for producing high-density molecule arrays having a pitch of 300 µm or less, the method comprising:
   (i) providing a target substrate having a plurality of discrete spots,
   (ii) conditioning selected spots of the target substrate by electromagnetic radiation, and
   (iii) reacting at least one monomer with reactants present in immobilized form in the selected spots of the target substrate,
   wherein there is provided at least one starting substrate having a film layer in which the at least one monomer is present, wherein step (ii) of conditioning selected spots comprises a selective transfer of material of the at least one monomer from the starting substrate to the target substrate and a site-specific fixing of the material to the target substrate, wherein the selective transfer and/or the site-specific fixing is by electromagnetic radiation which comprises laser light,
   wherein at least one intermediate layer which assists the transfer of material is arranged between the starting substrate and the film layer,
   wherein the selected transfer and the site-specific fixing of the material from the starting substrate to the target substrate is without direct contact between the substrates, and wherein the material is transferred in liquid or gaseous form.

2. The method of claim 1, wherein the selective transfer of material from the starting substrate and the site-specific fixing to the target substrate by contacting the starting substrate with the target substrate and heating or the film layer directly or indirectly by the electromagnetic radiation, wherein the material layer is situated between the starting substrate and the target substrate.

3. The method of claim 2, wherein the starting substrate and/or the target substrate comprises a flexible material.

4. The method of claim 2, wherein the starting substrate and/or the target substrate is exposed to vibrations or excited to mechanical oscillations during the contacting.

5. The method of claim 1, wherein the transfer of the material is by one or more of the mechanisms comprising ablation, detachment of the material by a pulse transmitted by photons, optical tweezers principle, generation of an electric field between the substrates and generation of a magnetic field between the substrates.

6. The method of claim 5, wherein the site-specific fixing of the transferred material to the target substrate is by direct or indirect heating of the material.

7. The method of claim 5, wherein the selective transfer of material is by expansion of the volume of the film layer, or wherein one or more intermediate layers which assist the transfer of material is arranged between the starting substrate and the material layer, and the selective transfer of material is by expansion of the volume of the at least one intermediate layer.

8. The method of claim 7, wherein the selective transfer of material is by the formation of a bubble in the film layer or the at least one intermediate layer.

9. The method of claim 1, wherein steps (ii) and (iii) are carried out iteratively with identical or different starting substrates.

10. The method of claim 1, wherein a space between the substrates and/or between monomer particles is filled with a liquid.

* * * * *